Feb. 26, 1924.

W. C. DODD 1,484,987

PUMP

Filed Jan. 20, 1923

William C. Dodd
INVENTOR

R. E. Wise.

BY Victor J. Evans
ATTORNEY

WITNESS:

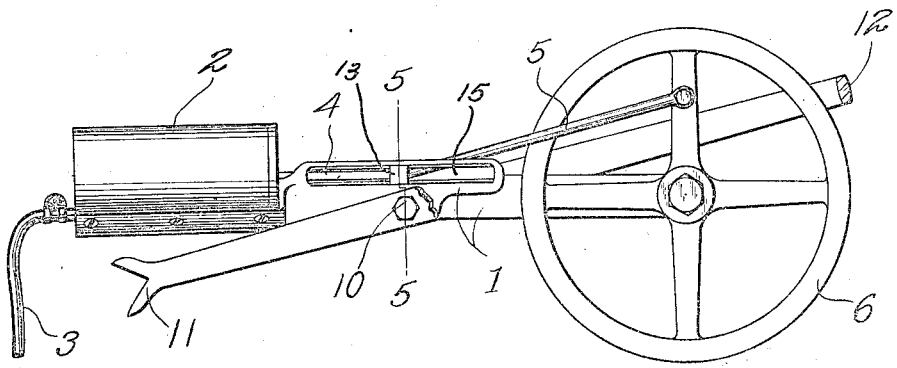
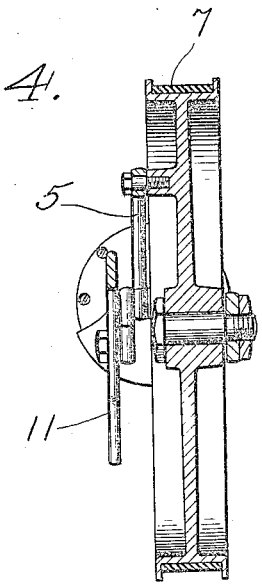
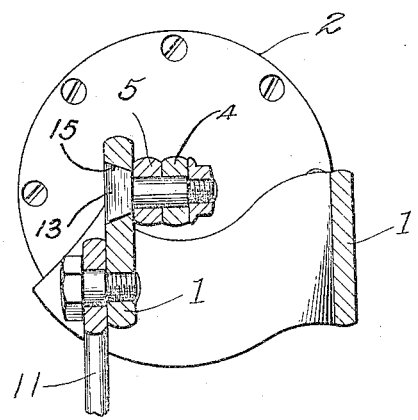

Patented Feb. 26, 1924.

1,484,987

UNITED STATES PATENT OFFICE.

WILLIAM C. DODD, OF BALD KNOB, ARKANSAS.

PUMP.

Application filed January 20, 1923. Serial No. 613,979.

*To all whom it may concern:*

Be it known that I, WILLIAM C. DODD, a citizen of the United States, residing at Bald Knob, in the county of White and State of Arkansas, have invented new and useful Improvements in Pumps, of which the following is a specification.

This invention relates to a tire pump, the the general object of the invention being to provide means for actuating the pump from the fan pulley.

Another object of the invention is to provide means whereby the pump can be held in place by the hand so that it is not connected in any way with the vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is an enlarged side view of the device itself.

Figure 4 is a sectional view.

Figure 5 is a section on line 5—5 of Figure 2.

Figure 1:
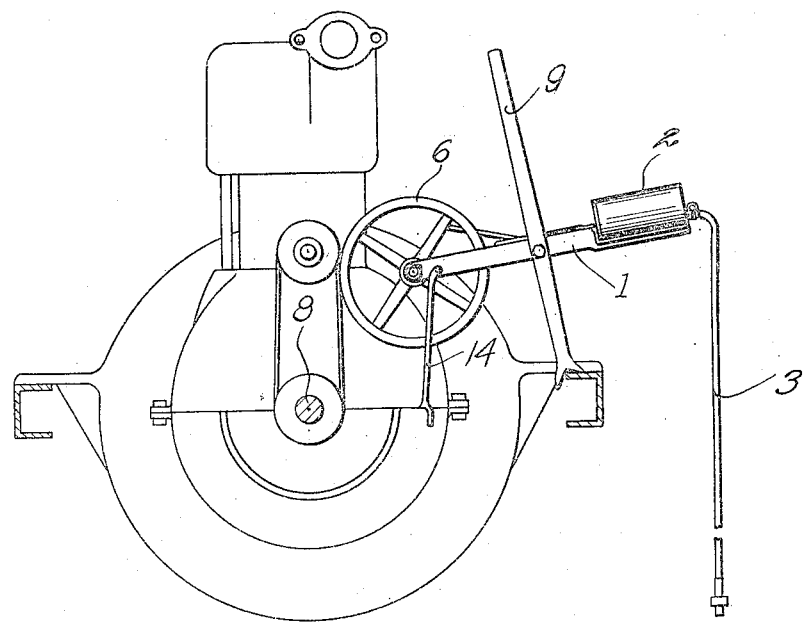
Figure 1 is a view showing the invention in use.
Figure 3:
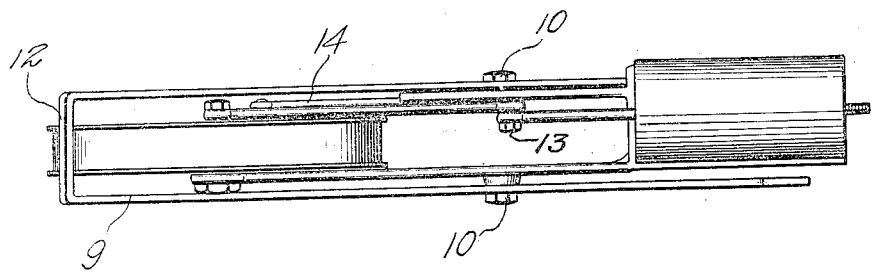
Figure 3 is a plan view thereof.

In these views 1 indicates a frame in which is supported a cylinder 2 of an air pump, the outlet of which has connected therewith a tube 3 which carries the usual air nipple for engagement with the valve stem of a pneumatic tire. The piston rod 4 of the pump is connected by the pitman 5 with the friction wheel 6 which is pivoted in the frame and which has a tire 7 of rubber or the like for frictionally engaging the fan belt pulley 8 of a motor vehicle. A yoke-shaped handle 9 is connected with the frame at 10, the ends of the handle being notched, as at 11, to engage a part of the hood frame, the handle being pressed against the frame by the hand grasping the bight 12. The handle is held in such a position that the wheel will engage the belt pulley so that said wheel will be rotated by the pulley and thus the pump will be actuated.

A forked lever 14 is pivoted to a part of the frame 1 for supporting the wheel end of the frame, as shown in Figure 1. This lever is folded against the frame when not in use and it may be made telescopic if desired so that the device can be adjusted to various heights. I also prefer to make the wheel a flanged one, as shown in Figure 4.

From the foregoing description it will be seen that the device can be easily and quickly placed in operation to pump up tires, as it is not connected in any way with the vehicle. When not in use it can be carried under the seat or in the tool box.

The frame is provided with a slot 15 which is adapted to be engaged by the pin 13 which connects the pitman to the piston rod, this arrangement of parts acting as a guide for the piston rod and pitman.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame, an air pump carried thereby, a friction wheel rotatably mounted in the frame and connected with the pump for actuating the same and a yoke-shaped handle connected with the frame and having notches in its ends for engaging a part of the hood frame of a motor vehicle to hold the wheel against the fan pulley of the vehicle.

2. A device of the class described comprising a frame, an air pump carried thereby, a friction wheel rotatably mounted in the frame, a pitman connecting the wheel with the piston rod of the pump, the frame having a slot therein and a projection on the pitman engaging the slot and a yoke-shaped handle connected with the frame.

In testimony whereof I affix my signature.

WILLIAM C. DODD.